Feb. 11, 1941.        M. BOOKMAN        2,231,655
VEHICLE JACKING AND PARKING DEVICE
Filed April 10, 1939        2 Sheets-Sheet 1

Max Bookman
INVENTOR
ATTORNEYS

Feb. 11, 1941. M. BOOKMAN 2,231,655
VEHICLE JACKING AND PARKING DEVICE
Filed April 10, 1939 2 Sheets-Sheet 2
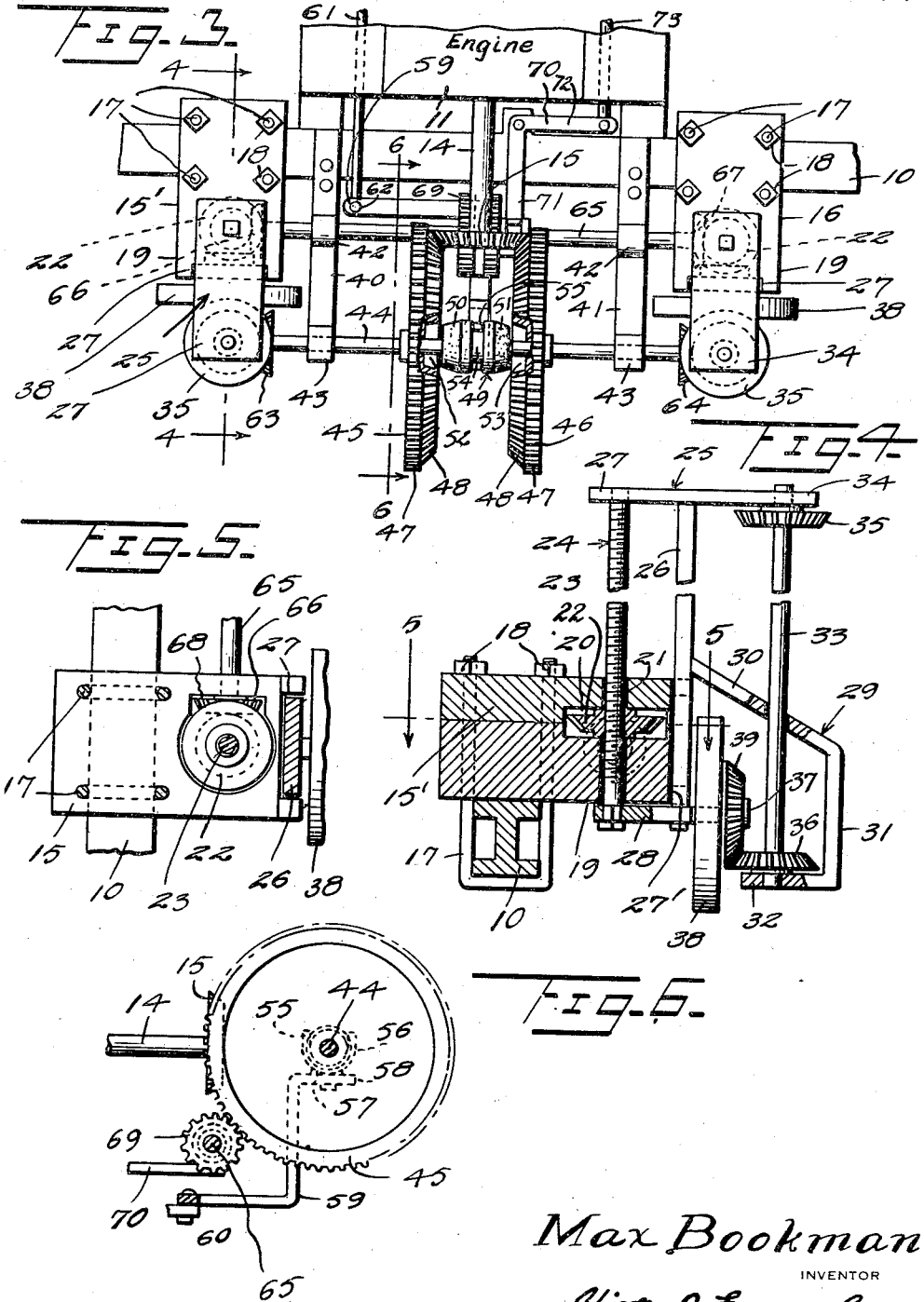
Max Bookman
INVENTOR
BY Victor J. Evans & Co.
ATTORNEYS Patented Feb. 11, 1941

2,231,655

UNITED STATES PATENT OFFICE 2,231,655

VEHICLE JACKING AND PARKING DEVICE

Max Bookman, East St. Louis, Ill.

Application April 10, 1939, Serial No. 267,195

6 Claims. (Cl. 180—1)

My invention relates to new and useful improvements in vehicle jacking and parking devices.

An important object of my invention is to provide a jacking and parking device for an automotive vehicle that will elevate the forward end of a vehicle to facilitate the act of parking and that may be operated by a power obtained from the engine of the vehicle.

Another object of my invention is to provide a jacking and parking device for an automotive vehicle that may be easily operated by the driver of the vehicle and without the necessity of his leaving the said vehicle.

Yet another object of my invention is to provide a jacking and parking device for an automotive vehicle that may be used to elevate the forward end of the vehicle for the purpose of changing a tire, or for the purpose of better gaining access to the underside of the engine of the vehicle.

Still another object of my invention is to provide a jacking and parking device for an automotive vehicle that will permit the driver of the vehicle to easily remove the same from a line of closely parked cars in which he is positioned in such a manner as to make the ordinary method of removing the vehicle an arduous or difficult task.

A further object of my invention is to provide an elevating and jacking device for an automobile that may be easily incorporated therewith in an inconspicuous manner.

A yet further object of the invention is to provide a jacking and elevating mechanism for an automotive vehicle that is strong and durable in its construction, efficient in operation and inexpensive to manufacture.

Other objects and advantages of my invention will be apparent during the course of the following description.

In the drawings, forming a part of this specification, and in which like numerals are employed to designate like parts throughout the same, Figure 1 is a front elevation of a device embodying my invention, showing the same in a raised or inoperative position and illustrating its association with the forward end of an automotive vehicle, Figure 2 is an enlarged fragmentary view of the same and showing my device in a lowered or operative position, Figure 3 is a top plan view of my device, Figure 4 is a vertical sectional view taken on the line 4—4 of Figure 3, Figure 5 is a transverse sectional view taken on the line 5—5 of Figure 4, and Figure 6 is a vertical sectional view taken on the line 6—6 of Figure 3.

In the accompanying drawings, wherein for the purpose of illustration, is shown a preferred embodiment of my invention, the numeral 10 designates the front axle of an automotive vehicle having an engine 11 and front wheels 12 and 13.

For the adaptation of the present invention the crankshaft 14 of the engine projects a short distance forwardly thereof but terminates rearwardly of the radiator, and a bevel-gear 15 is mounted on the outer end thereof for rotation therewith. The supporting blocks 15' and 16 are here illustrated as being secured to the front axle 10 of the vehicle; however, if it proves to be impractical or disadvantageous to secure the blocks to the axle of certain models or types of vehicles, they may be secured to the frame of the vehicle at points on either side of and equi-distant from the crankshaft 14 by means of the U-bolts 17 and nuts 18. The blocks 15' and 16 project forwardly of the axle and are of substantially square formation in cross section. The forward portions 19 of the blocks are formed with horizontally disposed inwardly extending recesses 20 and vertical bores 21 extend through the blocks at substantially the center of the recesses 20. The bevel-gears 22 are positioned within the recesses 20 and are formed with internally screw threaded bores which receive the threaded shanks 23 of the elevating screws 24. The elevating screws 24 extend entirely through the blocks 15' and 16 and brackets 25 are fastened to the upper and lower ends thereof. The brackets 25 comprise a vertically disposed member 26 which is slidably received in a vertical recess 27' in the ends of the blocks 15' and 16 and horizontally disposed upper and lower arms 27 and 28 the inner ends of which arms receive the upper and lower ends of the elevating screws 24. The brackets 25 are formed with auxiliary supporting arms 29 connected to the vertically disposed members 26 at substantially the middle thereof, which auxiliary arms include a portion 30 which extends angularly downwardly therefrom, the extremity 32 of the end 31 of each of the arms being bent inwardly to form a bearing support for the lower end of the vertically disposed shafts 33. The shafts 33 extend through and are supported by the angularly disposed portions 30 and the upper ends thereof are rotatably supported in the outwardly extending ends 34 of the upper arms 27. Bevel-gears 35 and 36 are keyed, or otherwise secured, to the shafts 33. The gears 35 bear against the under face of the arms 27, and the gears 36 abut the upper face of the extremities 32 of the supporting arms 29. Stub shafts 37 extend outwardly from the arms 28 and wheels 38 are rotatably mounted thereon. Bevelled gears 39 are integrally formed on the outer faces of the wheels 38 with the teeth thereof in meshed relation with the bevel-gears 36. As clearly illustrated in Figure 1, the gear 36 supported by the block 15', is adapted to engage the gear 39 at the bottom thereof, and the corresponding gear 36, supported by the block 16, is adapted to engage the corresponding gear 39 at its top in a manner to cause the wheels 38 to rotate in the same direction.

Supports 40 and 41 are carried by the axle 10 interjacent the blocks 15' and 16 and include spaced vertically disposed bearing supports 42 and 43. A countershaft 44 is rotatably mounted in the bearing supports 43 of the supports 40 and 41 and lies in a tranverse plane forwardly of the vehicle. The large gears 45 and 46 are loosely mounted to rotate independently of the countershaft 44 and are formed with radial peripheral teeth 47 and inwardly disposed bevelled teeth 48. The bevelled teeth 48 of the gears 45 and 46 mesh with the bevel-gear 15 which is keyed to the outer end of the crankshaft 14 in a manner whereby the rotation of the crankshaft will impart rotation in opposite directions to the gears 45 and 46. A friction clutch 49 is formed with right and left hand cones 50 and 51 which are adapted to be received within the inner recesses 52 and 53 of the gears 45 and 46. The friction clutch 49 is provided with a central annular recess 54 which receives the bifurcations 55 and 56 of the yoke 57. The yoke 57 is pivotally secured to the outer end 58 of a bell-crank lever 59 which is in turn pivotally secured to the frame at the point 60. The connecting rod 61 is fastened to the inner end 62 of the lever 59 to provide a means for shifting the clutch laterally along the countershaft 44 and into engagement with either of the gears 45 and 46. The pinions 63 and 64 are keyed or otherwise secured to the outer ends of the countershaft and disposed in contactual relation to the bevel-gears 35 carried by the vertical shafts 33. The pinions 63 and 64 will not mesh with bevel-gears 35 until the brackets 25 have been lowered to the lowermost position, as illustrated by the marked engagement of the pinion 63 and 35 in Figure 2.

The jack shaft 65 is rotatably mounted in the rear bearing supports 42 of the supports 40 and 41 and the outer ends thereof are received by the supporting blocks 15' and 16 and extend into vertical recesses 68 which are formed laterally of the horizontal recesses 20. Pinions 66 and 67 are secured to the ends of the jack shaft 65 and within the recesses 68 and in meshed relation with the bevel-gears 22.

A sliding spur gear 69 is slidably keyed to the jack shaft 65 intermediate of and engageable with the peripheral teeth of the large gears 45 and 46, and a bell-crank lever 70 is pivotally mounted to the frame with the arm 71 thereof pivotally attached to the gear 69 and with the arm 72 thereof pivotally attached to a connecting rod 73 to permit manual actuation of spur gear 69 laterally along the said jack-shaft.

The operation of my device is as follows:

If it is desired to park the vehicle in a comparatively small space, the rear of the same may be backed into the space and the present invention brought into operation to swing the forward end thereof transversely into the parking space. In the operation of the present invention, the crankshaft 14 is actuated at idling speed and the gear 15, keyed to the outer end thereof, is in meshed relation with the large gears 45 and 46 which are loosely mounted on the countershaft 44. The rotation of the gears 45 and 46 will be effected by this rotation, but the rotation will not normally be imparted to the countershaft due to the loose connection of the said gears therewith. It may be seen that the bevelled teeth 48 of the gears are disposed on opposite sides of the bevel-gear 15 in a manner whereby opposite rotation will be imparted to the gears 45 and 46. To lower the wheels 38, the spur gear 69 is moved laterally along the jackshaft by manually actuating the connecting rod 73 until the said gear is brought into engagement with the peripheral teeth 47 of the large gear 45. The rotation of the gear 45 will then be imparted to the jackshaft 65 and consequently to the pinions 66 and 67 at either end thereof. The pinions 66 and 67 are in meshed relation with the bevel-gears 22 which receive the elevating screws 23, and as the bevel-gears 22 are rotated, the elevating screws will be lowered to bring the wheels 38 into engagement with the ground, and upon further actuation thereof the wheels 12 and 13 of the vehicle will be elevated a substantial distance above the ground, as illustrated in Figure 2.

If the connecting rod 61 is manually actuated to move the friction clutch 49 laterally along the countershaft 44 and into engagement with either of recesses 52 and 53 of the gears 45 and 46, the rotation of the contacted gear will be effected and transmitted to the countershaft and consequently to the bevel-gears 63 and 64 keyed to the extremities thereof. When the elevating screw is in the lowermost position, as illustrated in Figure 2, the bevel-gears 35 will engage with the gears 63 and 64 and the rotation of the shaft 44 will be imparted to the vertical shafts 33. The rotation of the shafts 33 will be transmitted to the gears 36 to effect the rotation of the bevel-gear 39 integrally formed on the wheels 38. When the wheels 38 are rotated the forward end of the vehicle will be moved transversely due to the fact that the front wheels 12 and 13 of the vehicle are raised a substantial distance above the ground. The directional movement of the forward end of the vehicle will depend upon whether the clutch 49 was moved to the right or to the left to contact the oppositely revolving large gears 45 and 46. When the clutch 49 is moved to a neutral position, free of contact with the gears 45 and 46, no motion will be effected. Upon actuation of the spur gear 69 into engagement with the peripheral teeth 47 of the large gear 46, the elevating screws 23 will be raised in the blocks 15' and 16 by reason of the reverse actuation of the motion hereinbefore described to lower the same, and the front wheels 12 and 13 of the vehicle will be once more positioned on the ground. The continued elevation of the screws 23 will move the brackets 25 to the uppermost position, as illustrated in Figure 4, and to a position under the hood of the vehicle in a manner where it may not be observed by persons passing the same.

It may thus be seen that the device may be used for either parking or for removing the vehicle from a position in a line of closely parked cars and that the same will be easily effected without the necessity of the operator of the vehicle leaving his position therein. It is obvious that if it is desired to change either of the tires of the front wheels 13, the forward end of the vehicle may be elevated by manually actuating the spur gear 69 into engagement with the peripheral teeth of the large gear 45 to lower the elevating screws 23, and that as long as the friction clutch 49 is held in the neutral position, no motion will be transmitted to the wheels 38.

It is to be understood that the form of my invention, herewith shown and described, is to be taken as a preferred example of the same, and that various changes in the size, shape and arrangement of parts may be resorted to without departing from the spirit of my invention, or the scope of the appended claims.

Having thus described my invention, I claim:

1. A jacking and parking mechanism for an automotive vehicle comprising supporting blocks secured to the forward portion of the vehicle frame, elevating screws carried vertically by the said blocks, brackets attached to the opposite ends of the said screws and movable therewith, wheels journaled to the said brackets and mounted for rotation about an axis extending longitudinally of the vehicle, gear means formed on the said wheels, a driving gear connected to the crankshaft of the vehicle, a countershaft extending transversely of the said vehicle frame, spaced gears loosely mounted on the said countershaft and engaging the said driving gear for rotation in opposite directions, clutch means keyed to the said countershaft and slidable thereon to be selectively engaged with either of the said spaced gears to impart rotation to the said shaft in the desired direction, gear means for connecting the said countershaft to the said gears on the said wheels to rotate the same in the selected direction, and gear means connecting the spaced gears to the said elevating screws to raise or lower the same.

2. A jacking and parking mechanism for an automotive vehicle comprising supporting blocks secured to the forward portion of the vehicle frame, elevating screws carried vertically by the said blocks, brackets attached to the opposite ends of the said screws and movable therewith, wheels journaled to the said brackets and mounted for rotation about an axis extending longitudinally of the vehicle, gear means formed on the said wheels, a driving gear connected to the crank shaft of the vehicle, a countershaft extending transversely of the said vehicle frame, spaced gears loosely mounted on the said countershaft and engaging the said driving gear for rotation in opposite directions, clutch means keyed to the countershaft and slidable thereon intermediate of the said spaced gears, means to selectively actuate the said clutch into engagement with either of the said spaced gears to impart rotation of the said countershaft in the desired direction, a jack-shaft extending transversely of the said vehicle and spaced from the said countershaft, gear means slidably keyed to the said jackshaft and engageable with the said spaced gears, means to selectively actuate the said last-mentioned gear means to impart rotation to the jackshaft in the desired direction, gear means carried by the jackshaft and connected to the elevating screws to raise and lower the said elevating screws, and gear means carried by the countershaft and engageable with the gears formed on the wheels to rotate the same to swing the forward end of the said vehicle transversely.

3. An elevating and parking mechanism for an automotive vehicle comprising, normally elevated jacks mounted on the vehicle and including ground engaging wheels, a countershaft mounted for rotation adjacent to said jacks, spaced idler gears mounted on the countershaft and continuously rotated in opposite directions, clutch means keyed to the countershaft and slidable thereon to be selectively engaged with either of the said spaced gears to impart rotation to the shaft in the desired direction, gear means fixed to the countershaft and adapted to have a driving connection with the jack wheels to rotate the same in the selected direction, and gear means connecting the spaced gears to the jacks in a manner to raise or lower the same.

4. An elevating and parking mechanism for an automotive vehicle comprising, normally elevated jacks mounted on the vehicle and including ground engaging wheels, spaced idler gears continuously driven in opposite directions, gear means having a driving connection with the jacks to raise or lower the same, means engageable with either of the idler gears for driving the gear means in a selected direction, drive means for the said jack wheels, and means engageable with either of the idler gears for imparting rotation to the said drive means in a selected direction.

5. An elevating and parking mechanism for an automotive vehicle comprising, normally elevated jacks mounted on the vehicle and including ground engaging wheels, a countershaft journaled for rotation on parts of the vehicle, idler gears journaled on the countershaft and continuously driven in opposite directions, gear means fixed to the countershaft and adapted to have a driving connection with the said jack wheels, a clutch slidably keyed to the countershaft and engageable with either of the idler gears to rotate the jack wheels in a selected direction and driven gear means connected to the jacks for raising or lowering the same and including a slidable gear member engageable with either of the idler gears.

6. An elevating and parking mechanism for an automotive vehicle comprising, normally elevated jacks mounted on the vehicle and including ground engaging wheels, idler gears continuously driven in opposite directions, gear means having a driving connection with the jacks to raise or lower the same and including a slidable gear movable into engagement with either of the idler gears to rotate the gear means in a selected direction, drive means for the said jack wheels, and means engageable with either of the idler gears for imparting rotation to the said drive means in a selected direction.

MAX BOOKMAN.